July 24, 1923.
R. A. McCRONE
EGG SEPARATOR
Filed Oct. 6, 1922
1,462,606
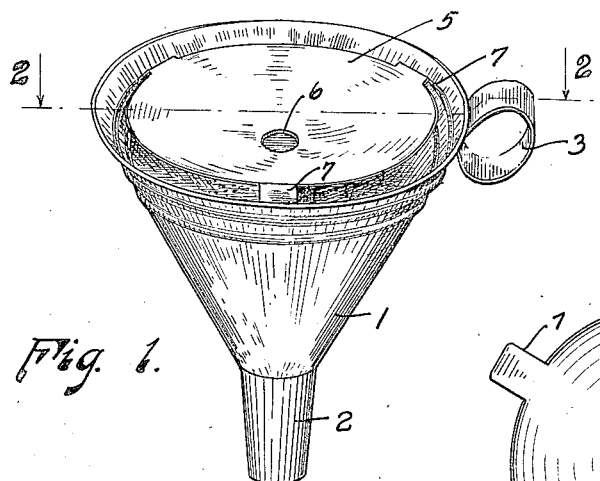
Fig. 1.
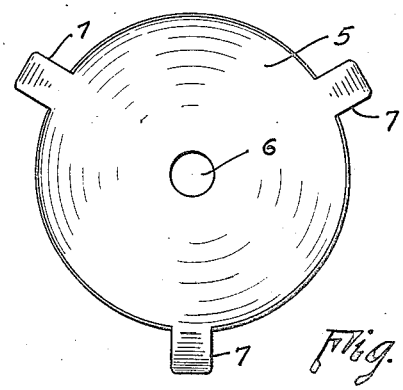
Fig. 3.
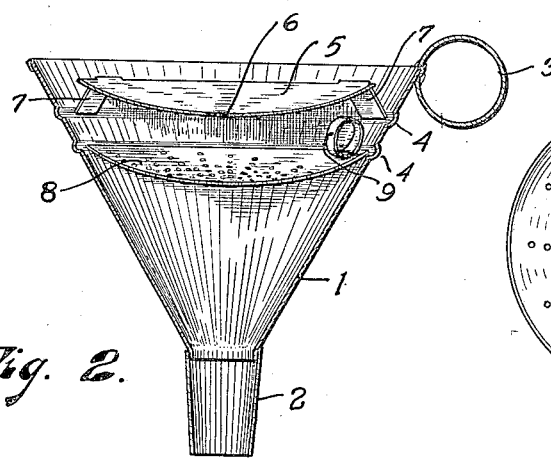
Fig. 2.
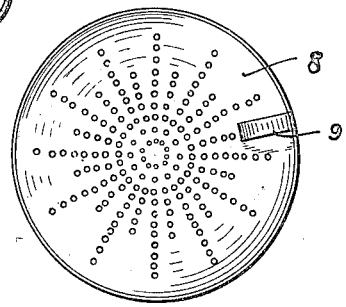
Fig. 4.
Inventor
Robert A. McCrone
By 
Attorney Patented July 24, 1923.

1,462,606

UNITED STATES PATENT OFFICE.

ROBERT A. McCRONE, OF DENVER, COLORADO.

EGG SEPARATOR.

Application filed October 6, 1922. Serial No. 592,752.

*To all whom it may concern:*

Be it known that I, ROBERT A. MCCRONE, a citizen of the United States, residing at the city and county of Denver and State of Colorado, have invented certain new and useful Improvements in Egg Separators; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to kitchen and table articles and has particular reference to an apparatus for separating the white from the yolk of an egg.

In many instances, not only in the baking of cakes or other foods, it is frequently desirable to use either only one part of the egg or to introduce the several parts of the egg into the mixture at different times and under varying circumstances. Hence it is important to provide a simple, convenient and easily cleansable device whereby such separation may be easily and thoroughly effected. The same condition obtains also in the dispensing of drinks at a soda fountain or the like where egg mixtures are made and sold that demand the separation of the white from the yolk.

Another object of the invention is to provide means that will strain out any broken pieces of shell from the white, as pieces of shell are very objectionable when incorporated in the food or the drink.

It is a further object of this invention to so construct my device that it can be cheaply and conveniently made and so that it can be employed for other uses as well as for that for which it is principally designed.

With the foregoing and other objects in view, the invention consists in the arrangement and combination of parts hereinafter described and claimed, and while the invention is not restricted to the exact details of construction disclosed or suggested herein, still, for the purpose of illustrating a practicable embodiment thereof, reference is had to the accompanying drawings, in which Fig. 1 shows a perspective view of my improved egg separator;

Fig. 2 shows a vertical section thereof taken on line 2—2, Fig. 1;

Fig. 3 shows a plan view of separator element; and

Fig. 4 shows a plan view of the strainer element.

The same reference numerals will be used to indicate the same parts throughout the several views.

Numeral 1 represents the main body portion of my separator, which is conical in shape and has attached to the vertex thereof a spout 2, the two members 1 and 2 forming a funnel which may be provided with a handle 3.

The conical portion 1 is provided near its top with a pair of spaced annular grooves 4, the purpose of which will presently appear. In order to adapt the funnel portion to function as an element of an egg separator, I attach thereto a separator element 5, which consists of a disked metal member having a central opening 6 and three projecting members 7 which are bent downwardly at an angle and co-operate with the upper groove 4 to hold the separator element in place. The members 7 act as springs, and when the ends thereof engage the groove 4, as shown in Fig. 2, the separator element 5 is held quite securely in place. In order to strain the white of the egg for the purpose of removing any broken bits of shell that may cling thereto, I provide a screening member, which is formed in the shape of a hollow dish and of such a size as to fit in the lowermost groove 4, in the manner shown in Fig. 2. The strainer 8 has secured thereto a handle 9 and is made of foraminated material. The strainer 8 may be omitted if desired, in which case its function would also be omitted. In the same manner the separator element 5 may be omitted and the strainer retained in place, in which case my device may be employed as a strainer. With both the separator element and the strainer removed, the parts 1 and 2 can be used as an ordinary funnel.

The egg is broken and the white and yolk dropped upon the separator element. The white will flow over the edges and through hole 6 and leave the yolk on the top of element 5. If a piece of shell should break off and drop onto the white, the strainer 8 will catch the same as the white flows through the openings therein.

From the above it will appear that I have produced an egg separator that is exceedingly simple and which has means for removing foreign matter from the white and which is so designed that the various elements can be used in combination to produce a certain result, or singly for some other purpose.

Having now described my invention, what I claim is:

1. An egg separator comprising in combination a conical body portion having a groove near its base and a separator element removably secured in said groove, said separator element consisting of a dish-like member having a central opening and a plurality of supporting members extending radially therefrom and adapted to removably engage in said groove.

2. An egg separator comprising in combination a conical body portion having a groove near its base and a separator element removably secured in said groove, a second groove and a strainer element secured therein.

In testimony whereof I affix my signature.

ROBERT A. McCRONE.